(12) United States Patent
Dellinger

(10) Patent No.: US 7,241,466 B2
(45) Date of Patent: Jul. 10, 2007

(54) CHARCOAL FLAP ASSEMBLY FOR GAS GRILLS

(75) Inventor: J. Scott Dellinger, Johnson City, TN (US)

(73) Assignee: Meco Corporation, Greeneville, TN (US)

( * ) Notice: Subject to any disclaimer, the term of this patent is extended or adjusted under 35 U.S.C. 154(b) by 540 days.

(21) Appl. No.: 10/395,423

(22) Filed: Mar. 24, 2003

(65) Prior Publication Data

US 2003/0177913 A1    Sep. 25, 2003

Related U.S. Application Data

(60) Provisional application No. 60/367,149, filed on Mar. 22, 2002.

(51) Int. Cl.
*A47J 37/07* (2006.01)

(52) U.S. Cl. .......................... 426/523; 99/340; 99/400; 99/401; 99/444; 99/446; 99/447; 99/450; 99/480; 99/482; 126/25 R; 126/41 R; 126/245; 126/153; 126/162

(58) Field of Classification Search .......... 99/446–447, 99/444, 467, 473, 403, 426, 340, 400–401, 99/450, 469, 480, 482; 426/520, 523; 126/25 R, 126/25 B, 41 R, 39 B, 242, 245, 153, 162

See application file for complete search history.

(56) References Cited

U.S. PATENT DOCUMENTS

| | | | | |
|---|---|---|---|---|
| 1,657,683 A | * | 1/1928 | Martineau ................ | 126/176 R |
| 2,985,097 A | | 5/1961 | Nevin et al. | |
| 4,683,867 A | * | 8/1987 | Beatty ....................... | 126/41 R |
| 4,750,469 A | * | 6/1988 | Biggs ........................ | 126/25 R |
| 4,819,614 A | * | 4/1989 | Hitch ........................... | 126/36 |
| 5,265,586 A | * | 11/1993 | Salerno ..................... | 126/41 R |
| 5,458,053 A | * | 10/1995 | Hsiao .......................... | 99/444 |
| 5,782,230 A | * | 7/1998 | Linnebur et al. ......... | 126/41 R |
| 5,878,739 A | * | 3/1999 | Guidry ..................... | 126/25 R |
| 5,890,422 A | | 4/1999 | Clark et al. | |
| 6,000,389 A | * | 12/1999 | Alpert ...................... | 126/25 R |
| 6,173,644 B1 | * | 1/2001 | Krall ........................... | 99/340 |
| 6,205,996 B1 | * | 3/2001 | Ryan ....................... | 126/41 R |
| 6,260,478 B1 | | 7/2001 | Harnett | |
| 6,314,868 B1 | * | 11/2001 | Christensen et al. .......... | 99/340 |
| 6,470,875 B2 | * | 10/2002 | Liu ........................... | 126/25 R |
| 6,523,461 B1 | * | 2/2003 | Johnston et al. .............. | 99/340 |
| 6,739,331 B1 | * | 5/2004 | Cohen ........................ | 126/283 |
| 6,945,160 B2 | | 9/2005 | Christensen et al. | |

\* cited by examiner

*Primary Examiner*—Drew Becker
(74) *Attorney, Agent, or Firm*—McGuireWoods, LLP

(57) ABSTRACT

The present invention is drawn to a gas grill or add-on component for a gas grill that provides the additional functionality of permitting grilling with either gas, charcoal briquettes, or wood chips. The additional functionality of being able to cook with charcoal or wood chips on a gas grill is achieved by positioning moveable flaps in a second position thus providing a horizontal surface above the gas burner, yet below the cooking surface, upon which to place charcoal briquettes. Spaces on either side of each pair of flaps allow the gas burners to be used to ignite the charcoal briquettes or wood chips. Once the charcoal briquettes or wood chips are ignited, use of the gas burner is discontinued. The charcoal or wood chips are permitted to burn to complete ash, then the moveable flaps are placed to a first position thus forming an apex that permits the ash to fall into an ash pan located in the bottom of the firebox. Alternatively, if cooking with gas is preferred, the movable pairs of flaps can be positioned in the first position thus forming an apex arrangement over the gas burners to protect the burners from drippings.

25 Claims, 7 Drawing Sheets

CHARCOAL FLAP ASSEMBLY FOR GAS GRILLS

RELATED APPLICATION

This application claims priority from provisional application No. 60/367,149 filed on Mar. 22, 2002.

BACKGROUND OF THE INVENTION

1. Field of the Invention

The present invention pertains to an outdoor grill for cooking food that is heated with a gas burner, traditional charcoal, wood chips, or a combination thereof. More specifically, a grill that has an adjustable platform for using charcoal briquettes or wood chips as a heating source where the charcoal briquettes or wood chips can be arranged on the adjustable platform above the gas burner, the gas burner can then be ignited which in turn will ignite the charcoal briquettes or wood chips. If charcoal or wood chips are not desired, the adjustable platform can also be positioned to permit heat transfer from the gas burner to the food being cooked. The platform also provides protection for the gas burners from grease and other flammable substances by channeling them away from the direct flame of the gas burner.

2. Background Description

Prior art grills are either fueled with a gas burner or with charcoal, but generally not both in a single combination.

U.S. Pat. No. 6,314,868 to Christensen et al. discloses a barbeque grill that cooks food by providing direct or indirect heat from a heat source of the cooker to the food. The outdoor cooker has a gas or charcoal heat source that provides direct and indirect heat to foods supported on a cooking surface of the grill by operation of a plurality of parallel louvers between the heat source and grill that are moved between first, upright positions of the louvers that provide direct heating of the food and second, angled relative positions of the louvers that provide indirect heating of the food.

U.S. Pat. No. 6,260,478 to Harniet discloses a heat dissipation system that uses a pair of panels rotatably mounted in a grill, which allows a cook to equalize the heat radiated within a gas or electric grill to provide more even heat distribution and prevents wind from extinguishing the burner flame, even in the presence of a crosswind. A grease drainage system is also described for a gas or electric grill.

U.S. Pat. No. 5,890,422 to Clark et al. discloses a convertible drip pan that can be opened and closed between the food supporting rack and the cooking heat source. Rapid preheating can be accomplished as well as searing of desired food products, followed by closing of the drip pan to prevent unwanted flare-ups caused by juices dripping from the food being cooked. This closing of the drip pan allows the food to cook slower than over direct heat. Different types of heat sources can be used in conjunction with Clark et al. such that the problem of the bottom of the housing rusting out in the area adjacent the round burner below the heat deflecting plate is reduced.

U.S. Pat. No. 2,985,097 discloses a gas broiler with a movable louvers or dampers interposed between the gas burners and the grates so that heat reaching the grates from the burners can be readily controlled.

What would be truly useful is a gas grill or add-on component for a gas grill that includes means to protect burners from drippings when used as a gas grill, but that has additional utility by adjusting to provide a platform for using charcoal as a heat source and wherein the gas burners can be used to light the charcoal. Additionally, a means to provide for ash removal would also be desirable.

SUMMARY OF THE INVENTION

The present invention is drawn to a gas grill or add-on component for a gas grill that provides the additional functionality of permitting grilling with either gas, charcoal briquettes, or wood chips by positioning moveable flaps in a first position thus providing a horizontal surface above the gas burner, yet below the cooking surface, upon which to place charcoal briquettes or wood chips. The flaps may also be arranged individually or to function as flap pairs as in the preferred embodiment. The flap pairs can be arranged to provide channels on each side of the flap pairs by gapping the flap pairs. Channels on either side of each pair of flaps allow the gas burners to be used to ignite the charcoal briquettes. Once the charcoal briquettes or wood chips are ignited, use of the gas burner is discontinued. After cooking the charcoal or wood chips is permitted to burn to complete ash, then the moveable flaps are moved to a second position thus forming an apex that permits the ash to fall into an ash pan located in the bottom of the firebox.

If cooking with gas is preferred, the movable pairs of flaps can be positioned in a second position thus forming an inverted "V" like apex arrangement over the gas burners to protect the burners from drippings when used as a gas grill. When the drippings are channeled away from the gas burners they are vaporized thus creating a pleasurable outdoor grilling aroma and smoke.

It is therefore an object of the invention to provide a method and apparatus to allow charcoal grilling in a gas grill.

It is another object of the invention to provide a method and apparatus to allow charcoal to be lit using a gas burner from a gas grill.

It is yet another object of the invention to provide a method and apparatus to protect gas grill burners from drippings and ashes.

It is yet another object of the invention to diffuse the heat through means by flap control.

It is a further object of the invention to provide a method and apparatus to provide easy removal of charcoal ashes from a gas grill.

It is another object of the invention to provide a method and apparatus to allow simple conversion or retro fitting of a standard gas grill to accommodate a mode for charcoal grilling.

These and other objects and advantages of the present invention will become apparent from a study of the following description and the accompanying drawings which are merely illustrative of such invention.

DETAILED DESCRIPTION OF A PREFERRED EMBODIMENT OF THE INVENTION

Figure 1:
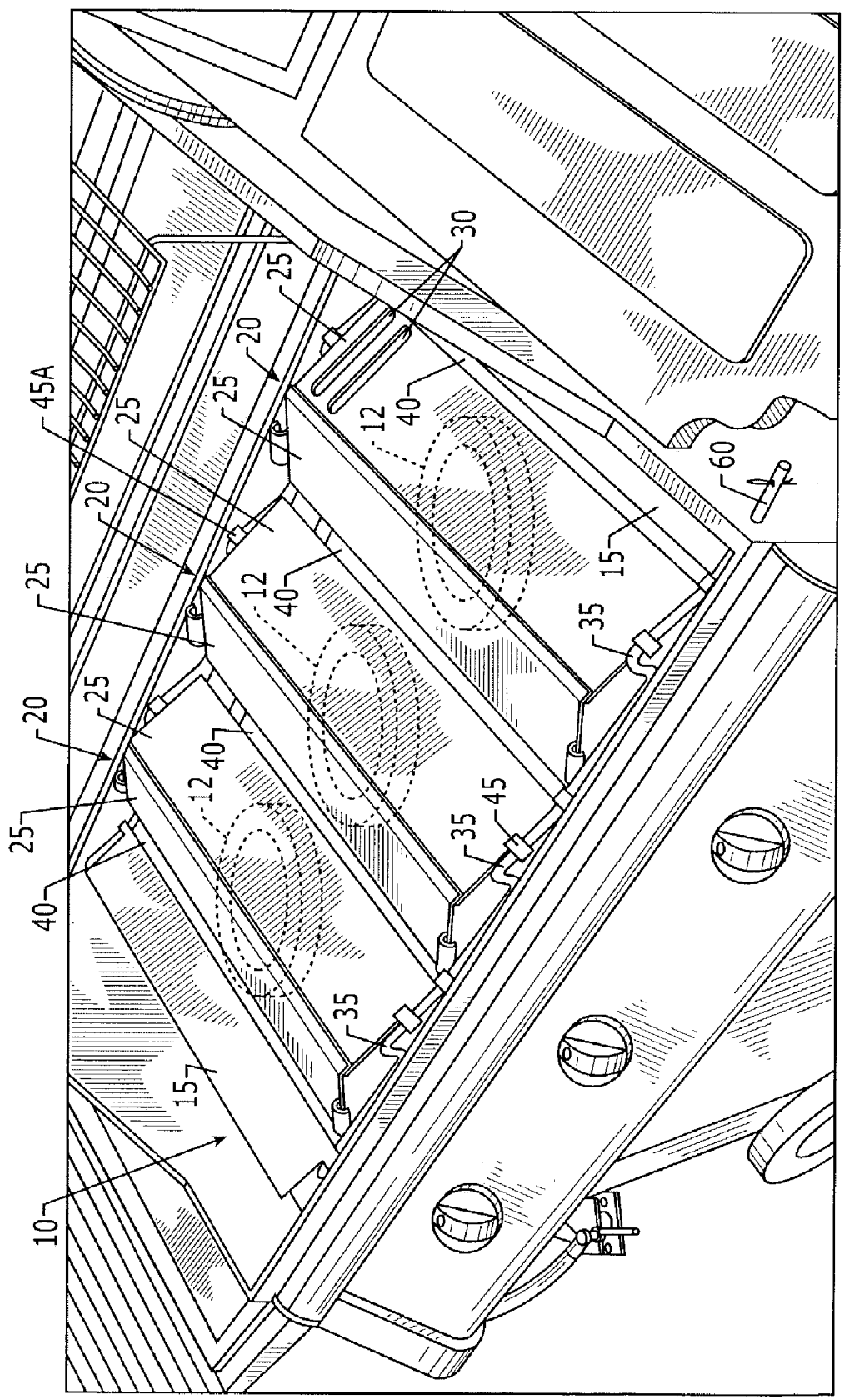
FIG. 1 illustrates the present invention in a configuration for use in gas grilling with the flaps up to form an apex configuration.

As shown in FIG. 1, the present invention has a standard configuration for use in gas grilling, wherein the flap pairs 20 are positioned by a control bar 35 to form an inverted "V" like apex above the gas burner 12. Heat sources other than gas burners 12 can also be used such as electric heating elements. The flaps 25 can be arranged individually or to function as flap pairs 20 as in the preferred embodiment. The flap pairs 20 may be arranged to provide channels 40 on each side of the flap pairs 20 by arranging the flap pairs 20 so that a gap exists on either side of the flap pairs 20. When the flaps 25 of the flap pairs 20 are in this apex position they form an 20° to 60° angle to the horizontal and form a 40° to 120° inclusion angle. Different width flaps 25 can be used that will alter to location of the apex by altering to point of contact between the flaps 25 without departing to the scope of the invention. In this particular embodiment, three sets of charcoal flap pairs 20 are used to cover the three gas burners 12. In this position, the flaps 25 protect the gas burners 12 from dripping juices and fat by directing the dripping material away from the gas burners 12 to avoid flare-ups (i.e., by channeling grease away from the flame), but still imparts a grilled flavor to foods. An additional single end flap 15 is located at each side to provide full coverage across the firebox 10 area. Although it is possible to use fixed panels for this purpose, a preferred embodiment uses movable end flaps 15. Additionally, the flaps 25 can act as radiant panels to evenly distribute heat.

Any number of flaps 25 can be used. The total number of flaps 25 in the preferred embodiment however is proportional to the number of gas burners 12 and therefore can be calculated by the equation:

Total Number of Flaps=(Number of Gas Burners)(2)+2

As mentioned above, a channel 40 may be provided adjacent to each flap pair 20. These channels 40 remain regardless of the flap 25 position due to pivoting the flaps 25 at a point adjacent the channel 40 and allowing the flap pairs 20 to overlap at the apex. The flaps 25 are formed of any suitable metal and are preferably porcelain coated. Other suitable materials include steel, stainless steel and aluminized steel. If needed, slits 30 (not shown) for venting of gasses can be punched in each flap 25. The slits 30 can also aid ignition of the charcoal briquettes by allowing flames or hot gasses to pass through the flap 25 directly onto the charcoal briquettes. Decorative patterns or embossing can also be added to the flaps 25 without departing from the scope of the invention.

Figure 2:
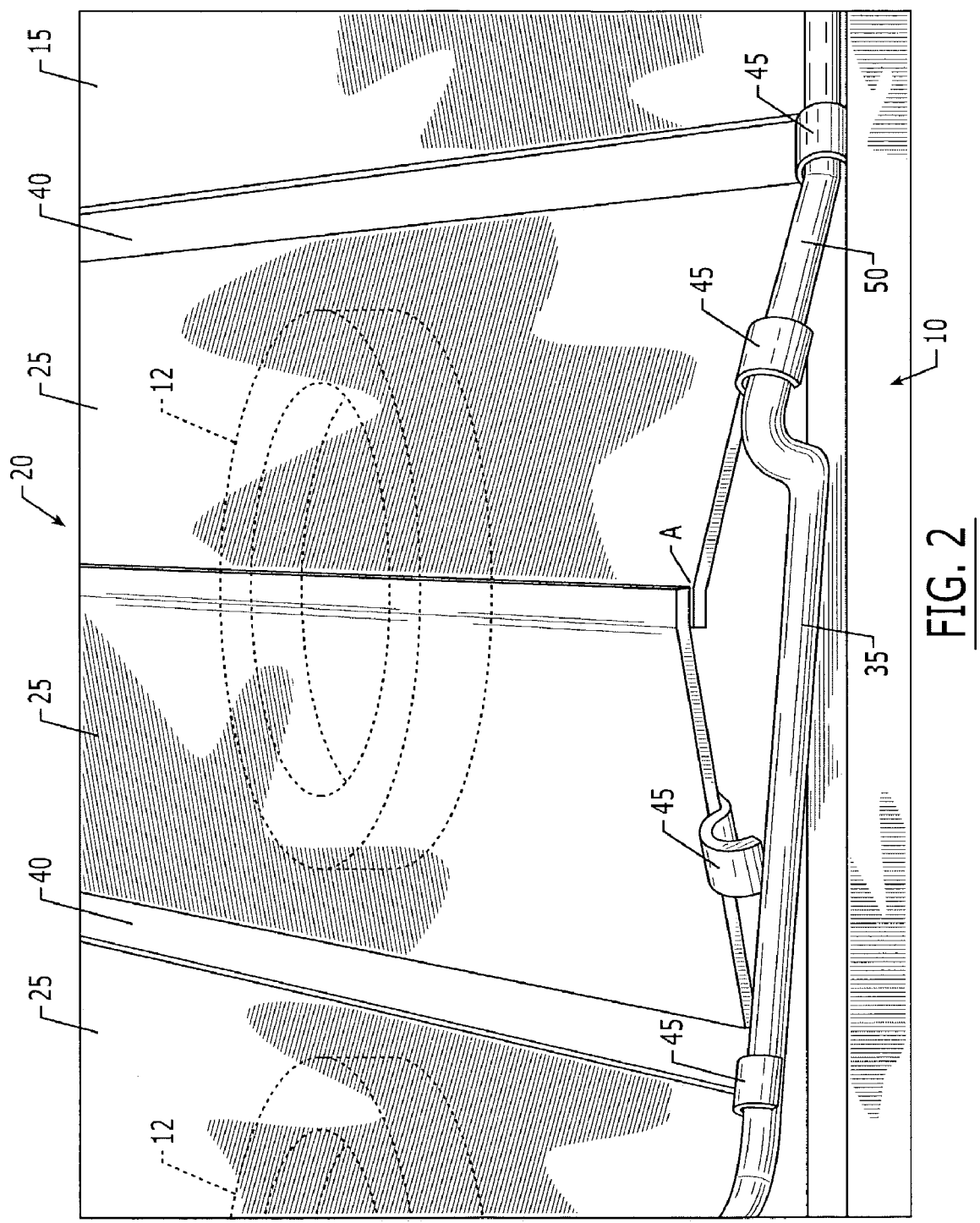
FIG. 2 illustrates a close-up view of the configuration for use in gas grilling with the flaps up to form an apex configuration.
Figure 3:
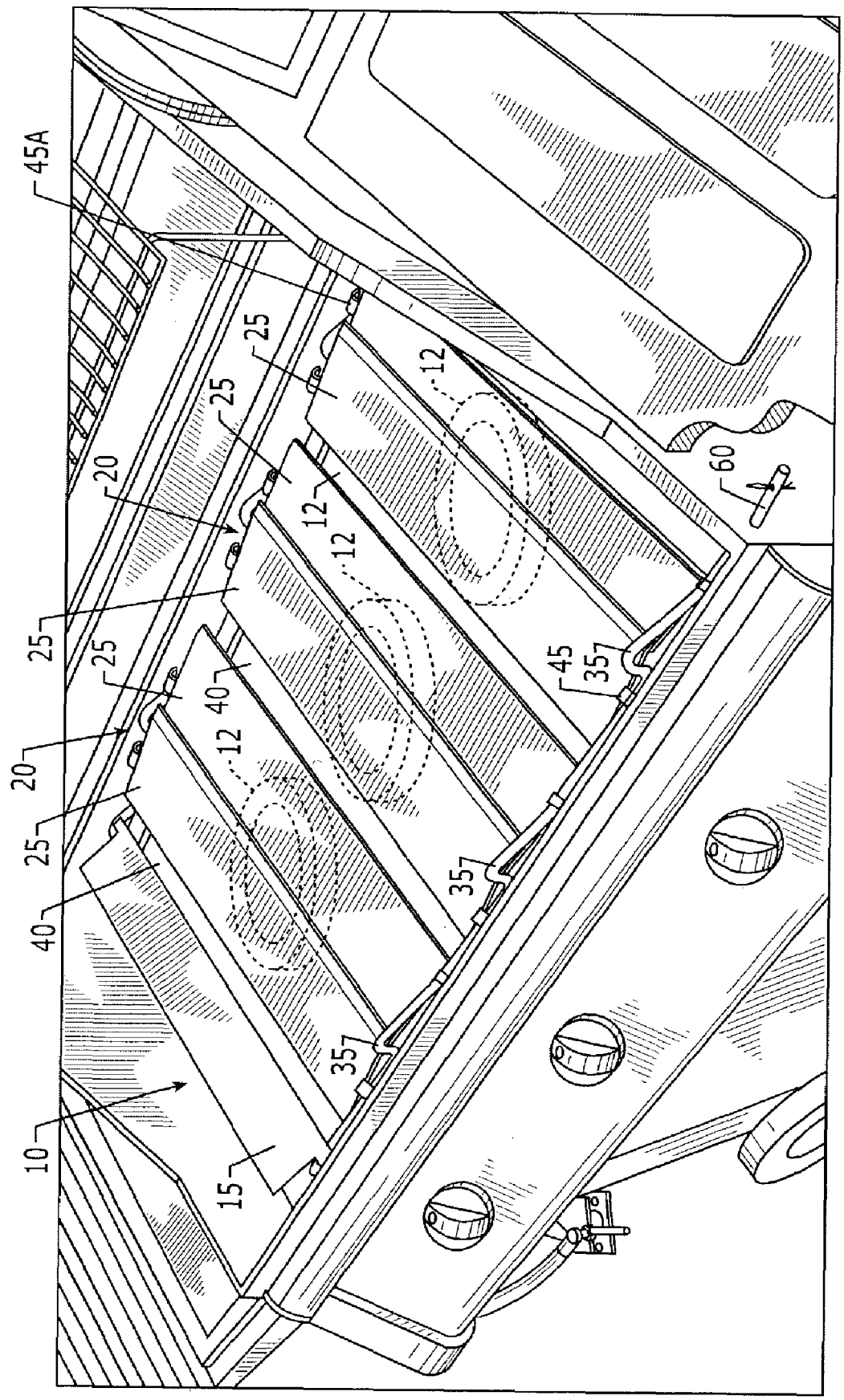
FIG. 3 illustrates the present invention configured for use in charcoal grilling with the flaps down to form a horizontal support.

FIG. 2 illustrates a close-up view of the configuration for use in gas grilling with the flap pairs 20 and end flaps 15 up to form an apex configuration. As seen more clearly in this figure, overlap of the two flaps 25 that comprise the flap pair 20 at point "A" allows the flap pair 20 to form an actuate angle that prevents grease from falling on the gas burner 12. Grease from cooking is safely channeled away from the flames and gas burner 12 without ignition.

Figure 6:
FIG. 6 illustrates a bar used in the present invention for varying the position of the pairs of flaps.
Figure 7A:
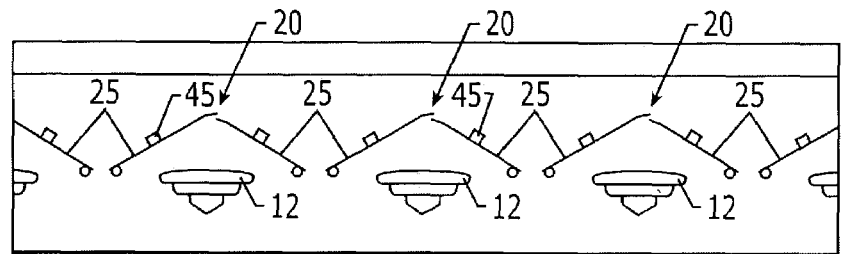
FIGS. 7A–7B illustrate cross-sectional views of the flaps in the apex and flat positions over the burners.
Figure 7B:
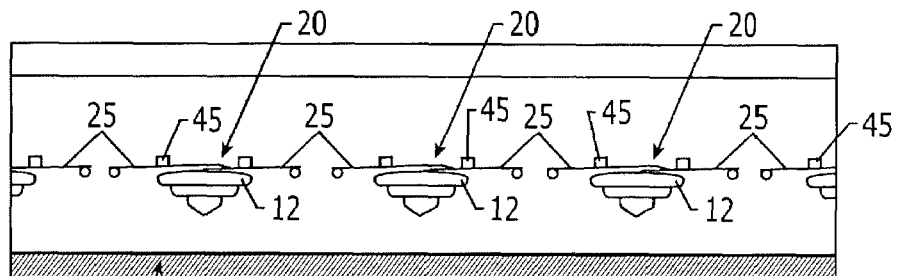

Upon movement of the control bar 35, the ramps 50 on the control bar 35 (additionally illustrated in FIG. 6) act on tabs 45 on the ends of the flaps 25 of the overlapping flap pairs 20 to rotate both flaps 25 about their pivots adjacent the channels 40 to position the flaps 25 in apexes, as additionally illustrated in FIG. 7A. In the preferred embodiment, the pivots are located off center on both of the ends of the flaps 25 where the back end joins the flaps' 25 longitudinal edge. The firebox 10 is adapted to receive the flaps' 25 pivot rod 60 which may be freely inserted or are held in place by inserting a cotter pin through the pivot rod 60 that extends outside of the firebox 10.

When the control bar 35 is moved such that the ramps 50 no longer contact the tabs 45, the flaps 25 rotate to a substantially horizontal position ranging from 0° to 10° from the horizontal, as illustrated in FIGS. 3, 4, 5, and 7B. These figures illustrate the present invention configured for use in charcoal grilling with the flaps 25 down to form a horizontal support for the charcoal. Typically, the control bar 35 will extend through the firebox 10 and include a heat resistant and insulating knob or lever positioned on its end to allow actuation by pulling. However, other actuating mechanisms may also be used. Other types of control bar 35 mechanisms can be used to actuate the flaps 25 including screw type devices and geared mechanisms.

The second position which is essentially horizontal places the flaps 25 close to the gas burners 12, the charcoal or wood chips can be quickly lit using the gas burners 12, but the flap 25 position is not suited to efficient combustion and therefore this lowered flap 25 position should only be used in conjunction with charcoal grilling.

Figure 4:
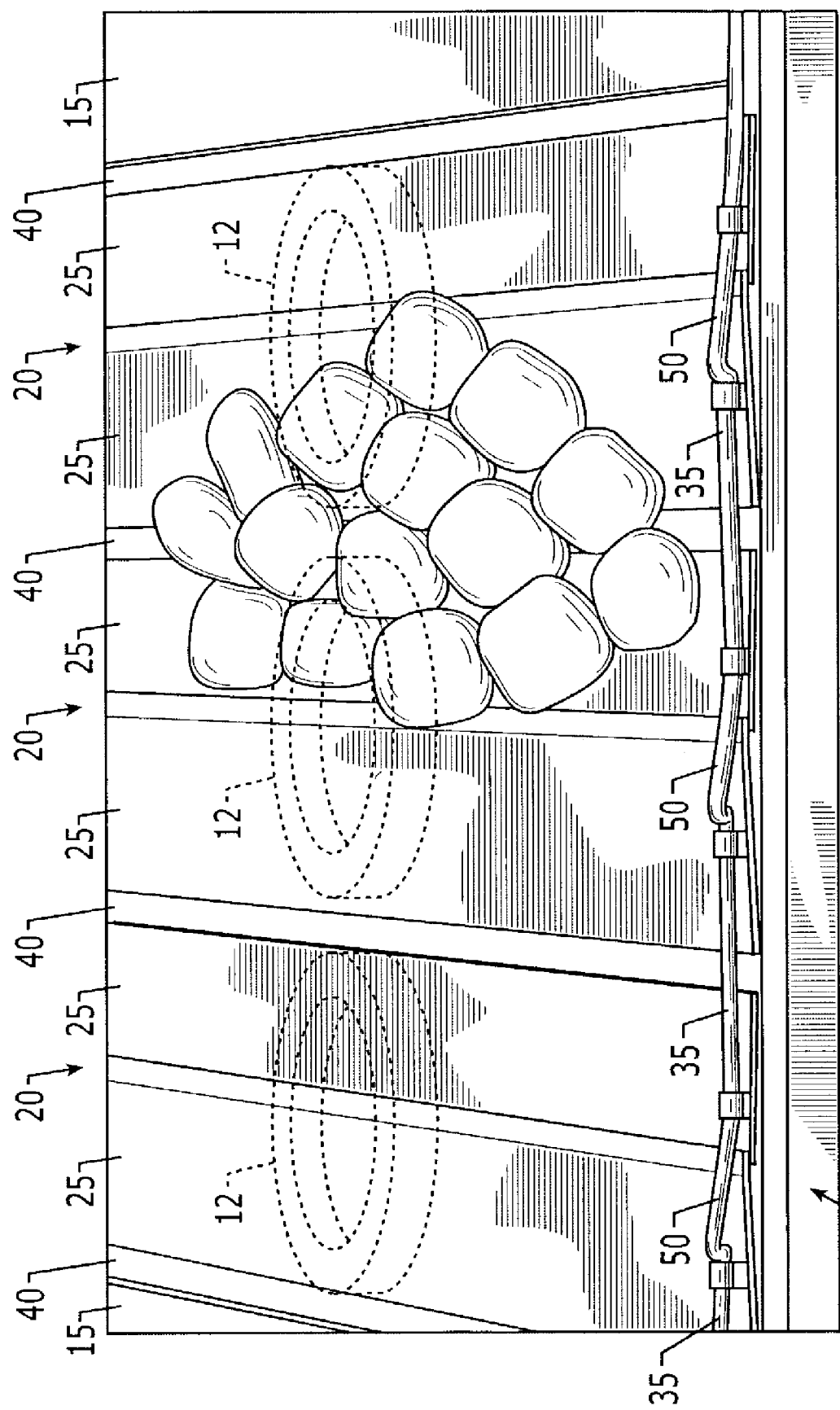
FIG. 4 illustrates a configuration for use in charcoal grilling with the flaps down to form a horizontal support for the charcoal.
Figure 5:
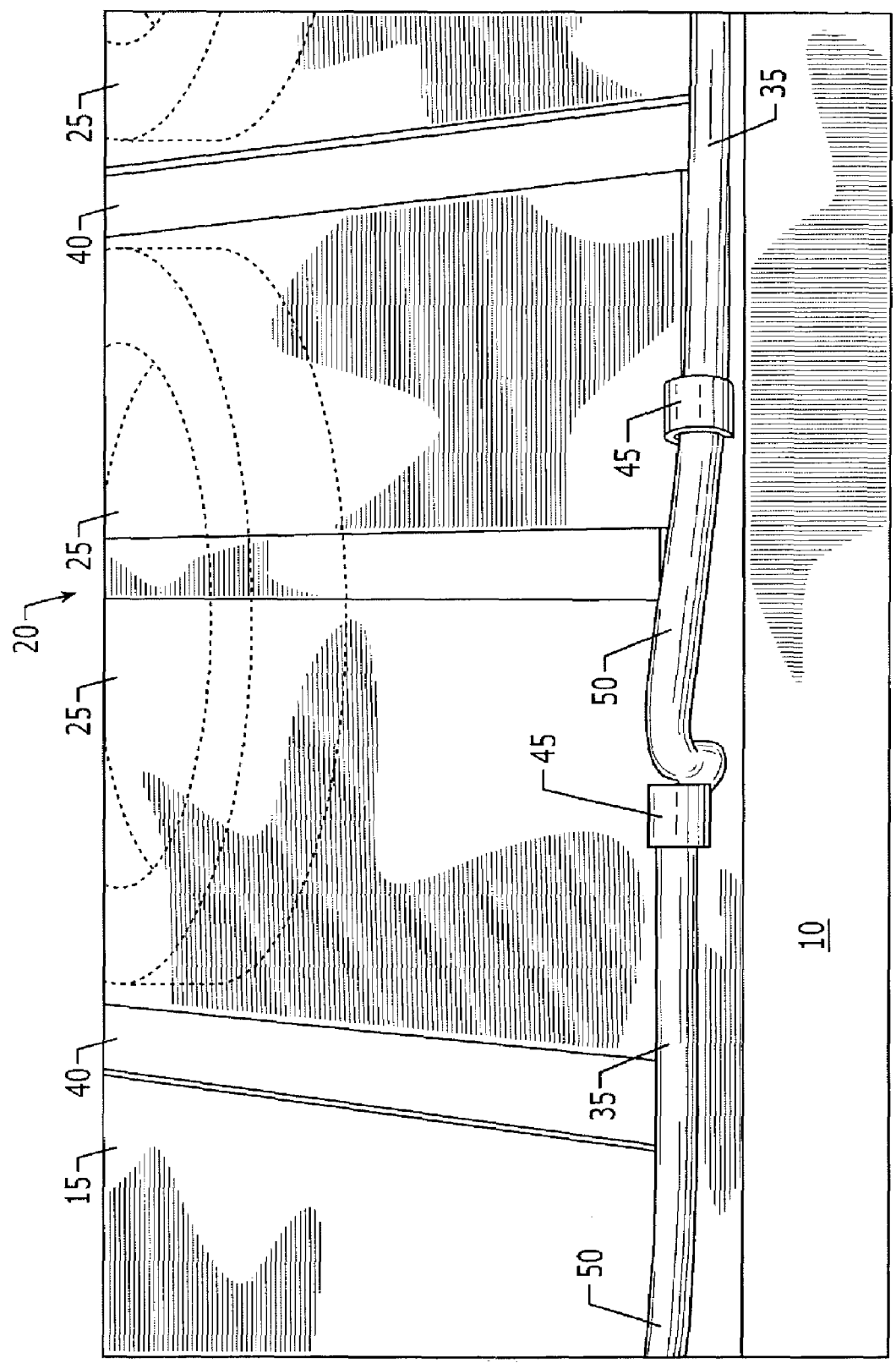
FIG. 5 illustrates a close-up view of the configuration for use in charcoal grilling with the flaps down to form a horizontal support.

FIG. 4 illustrates charcoal positioned on the horizontal flaps 25 in preparation for use. Note that the channels 40 are dimensioned such that typical charcoal briquettes will not pass therethrough. With the charcoal placed on the horizontal flaps 25, the gas burners 12 are ignited and operated for no more than 5 to 10 minutes so as to ignite the charcoal without the use of lighter fluids, paper, or the like. After the gas is turned off, the charcoal continues to burn until ready for cooking. It is then spread out and used in the usual manner for cooking. Alternatively, the charcoal may be randomly spread out on the horizontal flaps 25, the gas burner 12 ignited and operated for no more than 5 to 10 minutes so as to ignite the charcoal briquettes without the use of lighter fluids, paper, or the like. The gas is then turned off, just as before, and the charcoal continues to burn until ready for cooking.

The charcoal will eventually burn completely to ash. The flaps 25 are then raised using the control bar 35 thereby dumping the ashes through the channels 40 into the bottom portion of the firebox 10 for disposal while keeping the ash off the gas burners 12. Ash has the potential to block the ports on the gas burners 12, therefore it is important to channel the ash away from the gas burners 12 when dumping. The bottom of the firebox 10 can optionally be modified to expedite ash removal by any known means and/or can use the same means used for handling the grease.

Figure 8A:
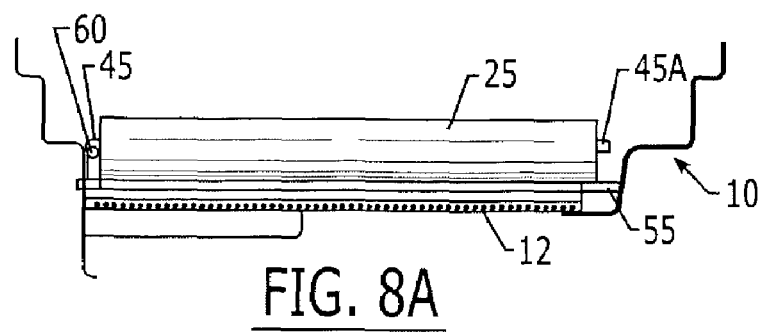
FIGS. 8A–8G illustrates various views of the flaps used in the present invention.
Figure 8B:
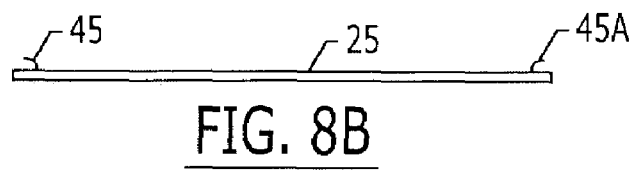
Figures 8C, 8D:
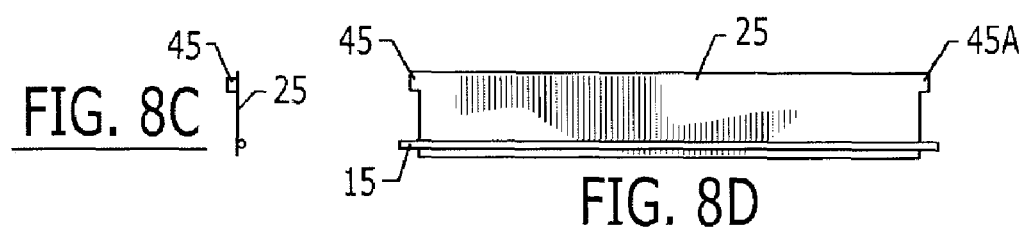
Figures 8E, 8F:
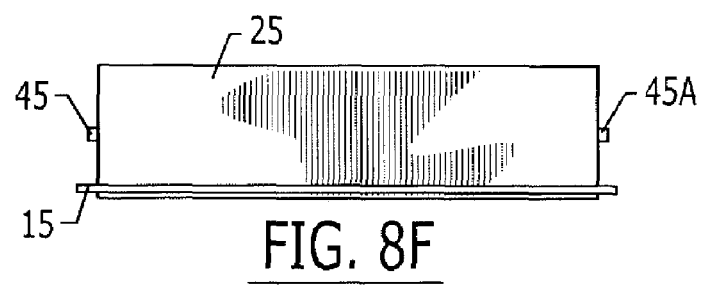
Figure 8G:
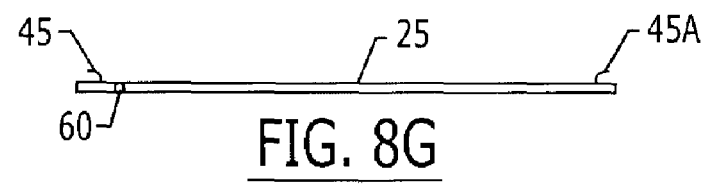

FIGS. 8A–8G illustrate various views of the preferred flaps 25 used in the present invention. FIG. 8A shows a cross sectional view of the flaps 25 in position in the firebox 10 of a gas grill. In this embodiment, each flap 25, as shown in FIGS. 8A–8G, includes a pivoting rod 60 that is rotationally supported within the firebox 10. The flaps 25 included in the flap pairs 20 are illustrated in FIGS. 8E–8G and include an arched tab 45 at one end for engaging the control bar 35 and a similar arched tab 45A on the other end which may be used for engaging a support bar 55 when the flaps 25 are in a horizontal position and supporting the weight of the charcoal. The single, end flap 15 is illustrated in FIGS. 8B–8D and also includes an arched tabs 45, 45A to allow the side opposite the pivot rod 60 to be supported.

In use, the present invention can be incorporated and fabricated integrally with a gas grill design or it can be designed as a stand-alone, removable or convertible unit for aftermarket or add-on applications.

Fireboxes 10 are typically either spherically rounded or rectangular in shape, although other embodiments are possible. Though not shown, a cover having a complementary configuration to the firebox 10 is removably positioned on top of the firebox 10 for covering the cooking surface. The cover may be either completely removable or hinged to the back sidewall of the firebox 10.

Although described herein with respect to a particular embodiment, the invention can be practiced in numerous other embodiments without departing from the scope of the invention. For example, although disclosed in a gas grill with three side-by-side gas burners 12 running front-to-back, it is clear that the present invention could also be used in arrangements having a different number of burners 12, a different orientation of burners 12 (i.e. side-to-side), or a different type of heating element (i.e. radiant burner, electric element, etc.). Additionally, different flap actuation means can also be used, such as a rotating bar or separate actuators for each flap pair or flap. Different flap spacing and pivot points can also be used without departing from the scope of the invention. For example, the pivot in the preferred embodiment is located in the corner of the flap, but it can just as easily be located along the center of the flap or any other suitable location. Additionally, different flap configurations and numbers of flaps can be used, such as a configuration with no channels or even a single flap.

What is claimed by Letters Patent is:

1. A grill for cooking food, comprising:
  a firebox with a bottom wall and at least one side wall that extends upward from the bottom wall;
  at least one heat source located inside said firebox;
  at least one pair of flaps arranged over said heat source, said pair of flaps having a first position in which the said pair of flaps is arranged substantially flat and a second position in which said pair of flaps is arranged in an inverted V shape over said heat source; and
  a control arm configured to engage said pair of flaps to switch said pair of flaps between the first position and the second position.

2. The grill of claim 1, wherein each flap has a first longitudinal edge and a second longitudinal edge at a first width end and a second width end thereof, respectively, and at least one of the first width end and the second width end is removably attached to said control arm.

3. The grill of claim 2, wherein said control arm comprises a plurality of ramps a configured to selectively engage at least one of the first width end and the second width end of said pair of flaps.

4. The grill of claim 3, wherein the ramps of said control arm selectively engage at least one of the first width end and the second width end of said pair of flaps such that said pair of flaps is inclined at an angle between 20 to 60 degrees with respect to the first position to form the inverted V shape.

5. The grill of claim 1, wherein said heat source is gas fueled.

6. The grill of claim 1, wherein said bottom wall comprises a removable ash pan configured to catch at least one of grease and charcoal ash channeled by said pair of flaps away from said heat source.

7. The grill of claim 2, wherein each flap comprises an arched tab on the first width end for engaging said control arm.

8. The grill of claim 1, wherein at least one flap of said pair of flaps comprises at least one slit.

9. The grill of claim 1, further comprising at least one end flap having a first longitudinal edge and a second longitudinal edge at a first width end and a second width end thereof, respectively, and at least one of the first and second width ends of said end flap is attached to said control arm.

10. A grill according to claim 1, wherein said firebox further comprises:
  a front wall and a back wall that are substantially parallel to each other and extend upward from said bottom wall, and
  a left side wall and a right side wall that extend upward from said bottom wall and are connected to said front wall and said back wall, and are substantially parallel to each other.

11. The grill according to claim 1, wherein said pair of flaps is configured to support charcoal or wood chips in the first position.

12. A grill for cooking food, comprising:
  a firebox with a bottom wall and at least one side wall that extends upward from said bottom wall;
  at least one heat source located inside said firebox;
  a plurality of flaps, each of said flaps comprising a first longitudinal edge and a second longitudinal edge at a first width end and a second width end thereof, respectively, said plurality of flaps comprising a first flap pair and a second flap pair neighboring each other with a channel therebetween; and
  a control arm attached to the first and second flap pairs, wherein said first and second flap pairs are arranged substantially flat when said control arm is in a first position, and said first and second flap pairs are inclined at an angle between 20 to 60 degrees with respect to the first position to form an apex when said control arm is in a second position.

13. The grill according to claim 12, wherein said at least one heat source is gas fueled.

14. The grill according to claim 12, wherein said flap pairs have a first arched tab on the first width end for engaging said control arm.

15. The grill of claim 12, further comprising at least one end flap having a first longitudinal edge and a second longitudinal edge at a first width end and a second width end thereof, respectively, said first and second width ends being removably attached to said control arm.

16. The grill of claim 12, further comprising an ash pan removably attached to said bottom wall of said firebox for catching grease and charcoal ash channeled by said flap pairs away from said heat source.

17. The grill of claim 12, wherein the sidewall of said firebox comprises:
  a front wall and a back wall that are substantially parallel to each other and extend upward from said bottom wall; and a left side wall and a right side wall that extend upward from said bottom wall, are connected to said front wall and said back wall, and are substantially parallel to each other.

18. The grill of claim 12, wherein said flap pairs have at least one slit.

19. A method of operating a gas grill, comprising the steps of:
arranging a plurality of flap pairs substantially flat;
arranging charcoal briquettes on top of the plurality of flaps pairs arranged substantially flat;
engaging a heat source located underneath said flap pairs;
permitting the heat source to ignite the charcoal briquettes through spaces between the flap pairs;
burning the charcoal to ash; and
arranging each of the flap pairs in an inverted V shape to permit the ash to fall though a channel between said flap pairs.

20. The method according to claim 19, further comprising a step of disengaging the heat source once the charcoal briquettes are ignited.

21. The method according to claim 19, further comprising a step of spreading the ignited charcoal briquettes evenly over the flap pairs in preparation for cooking.

22. The method according to claim 19, further comprising a step of placing a cooking surface above the flap pairs.

23. The method according to claim 19, further comprising a step of removing the charcoal ash collected in a drip pan by withdrawing the drip pan and discarding the ash.

24. The method according to claim 19, wherein said step of permitting the heat source to ignite the charcoal briquettes step takes between 5 to 10 minutes.

25. The method according to claim 19, wherein the heat source is gas fueled.

* * * * *